United States Patent [19]

Reis

[11] Patent Number: 4,674,472

[45] Date of Patent: Jun. 23, 1987

[54] BOW HIP REST

[75] Inventor: Daniel S. Reis, Osteen, Fla.

[73] Assignee: Raymond W. Leahy, Osteen, Fla.

[21] Appl. No.: 735,255

[22] Filed: May 17, 1985

[51] Int. Cl.⁴ .......................... F41B 5/00; B68G 5/00
[52] U.S. Cl. .................................. 124/89; 124/23 R; 273/DIG. 19; 248/118
[58] Field of Search ............. 124/86, 88, 35 A, 23 R, 124/25, 20 R, 89; 273/DIG. 19, 191 R, 191 B, 192, 193 R, 194 R, 19; 135/75, 82; 248/118

[56] References Cited

U.S. PATENT DOCUMENTS

| | | | |
|---|---|---|---|
| 46,365 | 2/1865 | Kinman | 248/118 |
| 869,128 | 10/1907 | Autenrieth | 135/73 |
| 989,463 | 4/1911 | Wilde | 135/73 |
| 3,968,783 | 6/1976 | Pfotenhauer | 124/25 |
| 4,290,407 | 9/1981 | Damron | 124/80 |
| 4,399,994 | 8/1983 | Hourihan | 273/191 R |

Primary Examiner—Richard C. Pinkham
Assistant Examiner—Gary Jackson
Attorney, Agent, or Firm—Macdonald J. Wiggins

[57] ABSTRACT

A hip rest device for attachment to an archer's bow to provide stability during aiming and shooting. A bracket screwed to the hand grip of the bow has a rod extending toward the bow string and bent downward at an obtuse angle. A padded hip rest is attached to the lower end of the rod to permit bracing the bow against the archer's hip. A threaded connector may be provided for attaching the lower end of the rod to the hip rest for adjusting the effective length of the rod.

5 Claims, 3 Drawing Figures

BOW HIP REST

BACKGROUND OF THE INVENTION

1. Field of the Invention

The present invention relates to an archery bow, and more particularly to a hip rest for stabilizing the bow during use.

2. Description of the Prior Art In the sport of archery, it is necessary for the archer to hold the bow steady during aiming and release of an arrow. In recent years, very elaborate bows have been designed, some having compound strings and aiming devices attached thereto. Such bows are relatively heavy and are difficult for the archer to maintain steady. Various devices, such as counterweights and the like, have been proposed to assist the archer.

For example, Koser in U.S. Pat. No. 3,256,872 shows a stabilizer consisting of a pair of adjustable rods which project forward from the bow in a vee and which are also used as a bow stand. Leidy, U.S. Pat. No. 3,880,136 discloses a steady rest that attaches to the hand and wrist of the archer and includes a member which contacts the archer's jaw. In U.S. Pat. No. 4,290,407 to Damron, a combination guide tube and chin/jaw bone butt is taught. However, none of these prior art devices diminishes the strain on the archer's arm, and provide only minimum bracing. Thus, there is a need for a device which will assist the archer in maintaining the bow steady by relieving strains on the arm holding the bow.

SUMMARY OF THE INVENTION

The invention is a device which can be attached to the bow and having a hip rest connected thereto. In one implementation of the invention, a bracket is attached by screws to the forward part of the bow grip. A rod, which may be formed from metal, is attached to the bracket and extends rearwardly toward the bow strings. The rod is bent at an obtuse angle, continues at an angle downwardly and terminates in a pad device.

Preferably, the length of the extended rod is adjustable. The length of the rod is selected or adjusted such that the pad at the end of the rod rests on the archer's hip when the bow is held in the normal shooting position. For a right handed archer, it will be understood that the pad rests on the left hip.

As will now be understood, the bracing effect of the hip rest of the invention will relieve strain on the archer's bow holding arm and therefore permits the bow to be held steadier than has been possible in the past.

The rod may be formed from steel or aluminum and is made adjustable by the use of a threaded connector which connects a lower length of the rod to which the hip pad is attached to the upper part of the rod attached to the bow bracket. The hip rest may be formed from any suitable material, preferably having padding of foam rubber or the like covering the rest for the comfort of the user.

It is therefore a principal object of the invention to provide a hip rest which is attachable to the grip of an archer's bow for steadying the bow during aiming and shooting.

It is another object of the invention to provide a simple, low cost hip rest which can be attached to a bow and which is adjustable to match the height and arm length of an archer.

It is still another object of the invention to provide an archer's hip rest having a bracket attachable to the bow handle and a rod extending downward to a pad which rests on the archer's hip.

These and other objects and advantages of the invention will become apparent from the following detailed description when read in conjunction with the drawings.

DETAILED DESCRIPTION OF THE PREFERRED EMBODIMENT

Figure 1:
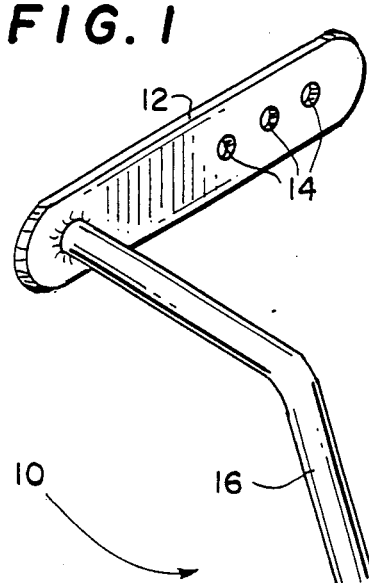
FIG. 1 is a perspective view of the hip rest of the invention.

Referring first to FIG. 1, a perspective view of the bow hip rest 10 of the invention is shown. A bracket is provided which can be attached to a bow handle by screws through two or more holes 14 therein. The bracket 12 may be formed from suitable metal or other material. Assuming that the bracket 12 is formed from metal, the proximal end of metal rod 16 is welded to one end of bracket 12 as shown. Rod 16 extends, preferably at right angles to bracket 12, a short distance at which point rod 16 is bent at an acute angle. The distal portion of rod 16 extends downward and is threaded. A second rod 20 is provided having a threaded distal end and a hip brace 24 attached to its proximal end. An internally threaded connector 18 is provided for coupling rod 16 to rod 20 and is locked in a selected length by a pair of lock nuts 17. As will be understood, the connector 18 and lock nuts 17 permit the adjustment of the effective lengths of rods 16 and 20 with respect to the bow and hip brace 24 to accommodate the physical size of the archer.

Figure 3:
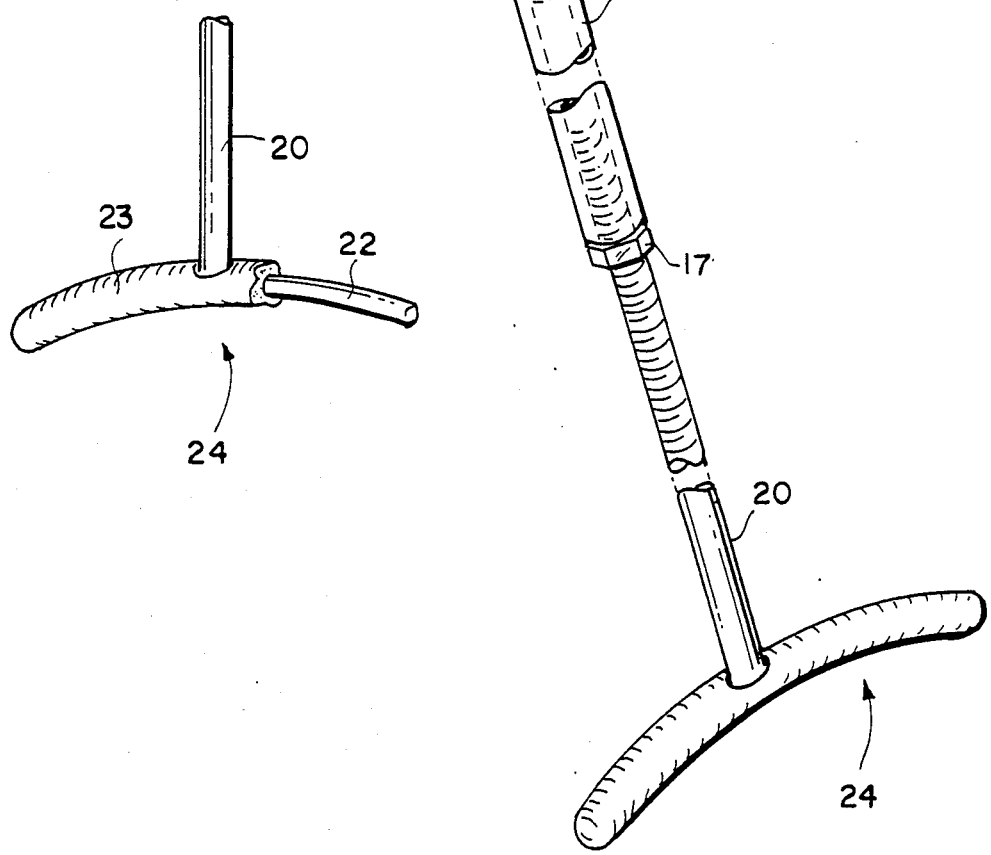
FIG. 3 is a partial view of the hip rest pad and rod of the device of FIG. 1.

Turning now to FIG. 3, a preferred construction of hip brace 24 is shown. A metal hip rod 22 is welded to the proximal end of rod 20 and is covered with padding 23 which may be expanded foam rubber, plastic or similar material.

Figure 2:
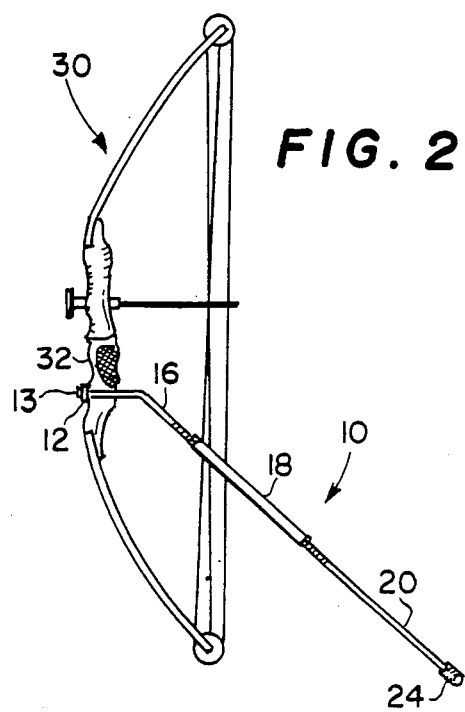
FIG. 2 is a side view of a typical bow having the hip rest device of FIG. 1 installed thereon.

In FIG. 2, the bow hip rest 10 is shown attached by screws 13 to the front surface of bow handle or grip 32 of a bow 30. As will be seen, rod 16 extends horizontally and rearwardly from the bow handle for a short distance and then extends downwardly toward the archer's hip. As previously mentioned, connector 18 is adjusted so that hip brace 24 rests on the archer's hip when the grip 32 is held in the left hand with the arm extended in normal aiming fashion.

Although the bow hip rest device of the invention has been described with reference to a specific embodiment and construction, it will be understood that various modifications can be made without departing from the spirit and scope of the invention. For example, the device can be made and tailored to a specific individual without the necessity for an adjustment means.

Although the preferred embodiment utilizes metal such as aluminum or steel, it is clear that modern plastics are available from which the device can be constructed. Similarly, the design of the hip brace can be varied to suit the individual.

I claim:

1. A hip rest for an archer's bow, said bow having a handle, comprising:

(a) a hip brace for resting upon the archer's hip;

(b) a rod having a first end connected to said hip brace and extending upward and outward therefrom, said rod having
   (i) a first section having said first end connected to said hip brace and an externally threaded end,
   (ii) a second section having an externally threaded end,
   (iii) adjustment means for adjusting the length of said rod including an elongated internally threaded coupling for receiving said threaded ends of said first and second sections,
   (iv) locking means for locking said coupling and said first and second sections in a selected position; and
(c) attachment means connected to a second end of said second section for attachment to said handle of said bow wherein the length of said rod is selected such that said hip brace rests on the archer's hip when the bow handle is held in the normal shooting position.

2. The hip rest as recited in claim 1 in which said hip brace includes padding.

3. The hip rest as recited in claim 1 in which said attachement means is a bracket connected to said rod and attachable to said handle by screws.

4. A bow rest and stabilizer for attachment to an archer's bow having a hand grip and bow string comprising:
   a bracket for attaching to said bow hand grip;
   a first rod having a proximal end connected to said bracket and extending at right angles to said grip toward the bow string of said bow and bent at an obtuse angle in the plane of said bow and bow string, said first rod having a threaded distal end;
   an elongated adjustable connector threaded onto said threaded distal end of said first rod;
   a second, straight rod having a threaded proximal end adjustably threaded into said connector and having a distal end; and
   a hip brace attached to said distal end of said second rod.

5. The bow rest and stabilizer as recited in claim 4 in which said hip brace is padded.

* * * * *